C. M. HECK.
APPARATUS FOR INCUBATING.
APPLICATION FILED NOV. 19, 1914.
1,424,821.
Patented Aug. 8, 1922.
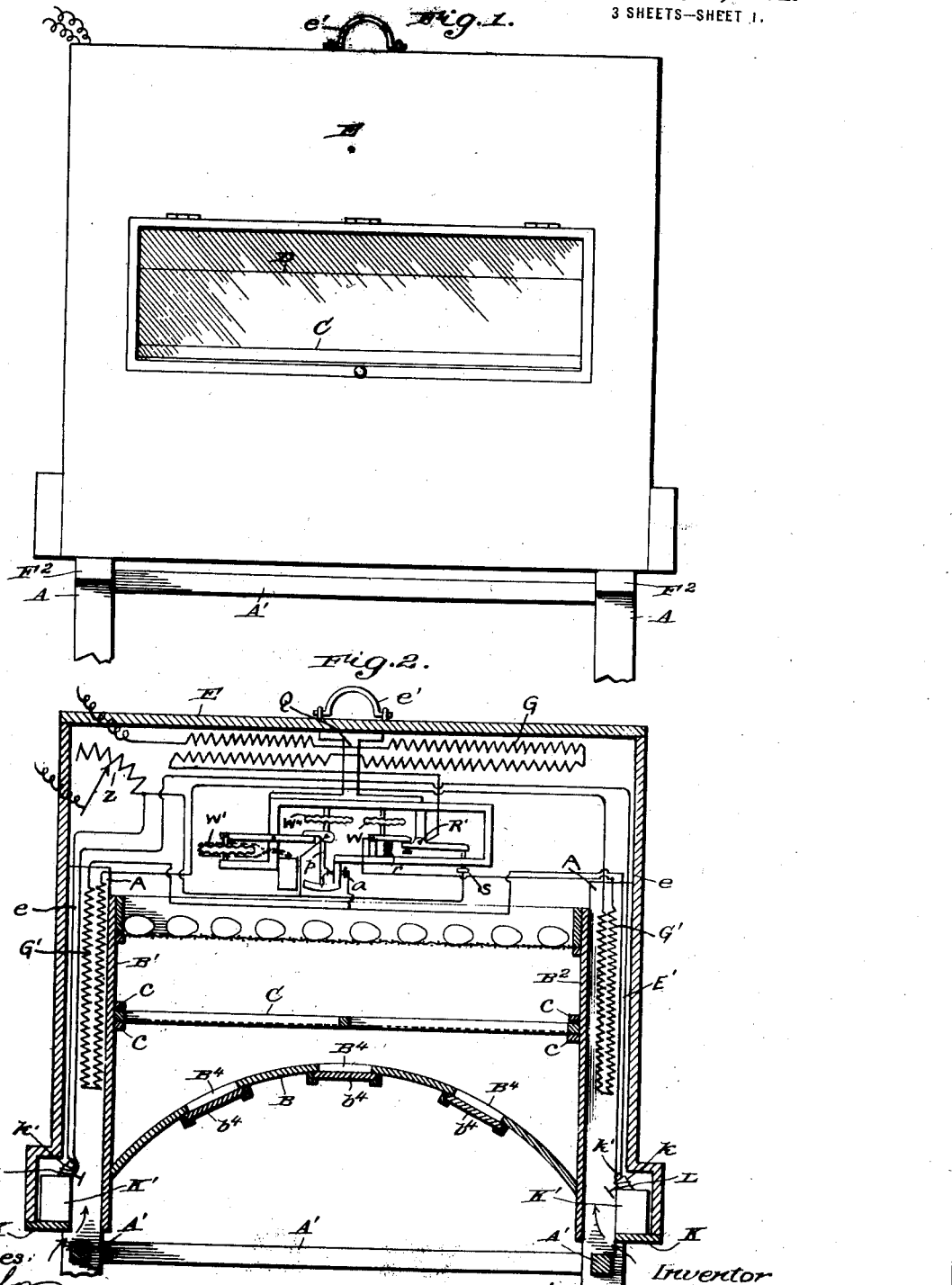

C. M. HECK.
APPARATUS FOR INCUBATING.
APPLICATION FILED NOV. 19, 1914.
1,424,821.
Patented Aug. 8, 1922.
3 SHEETS—SHEET 2.
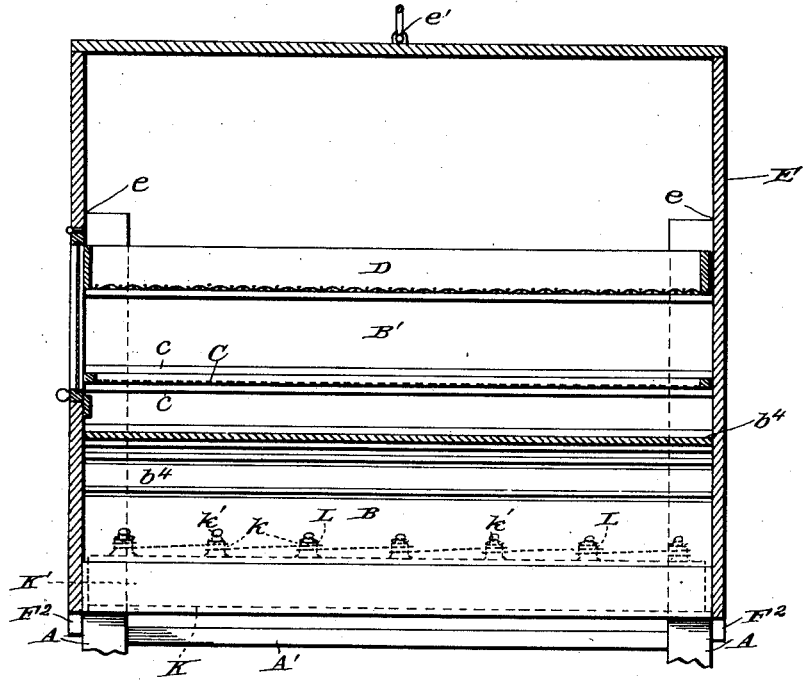
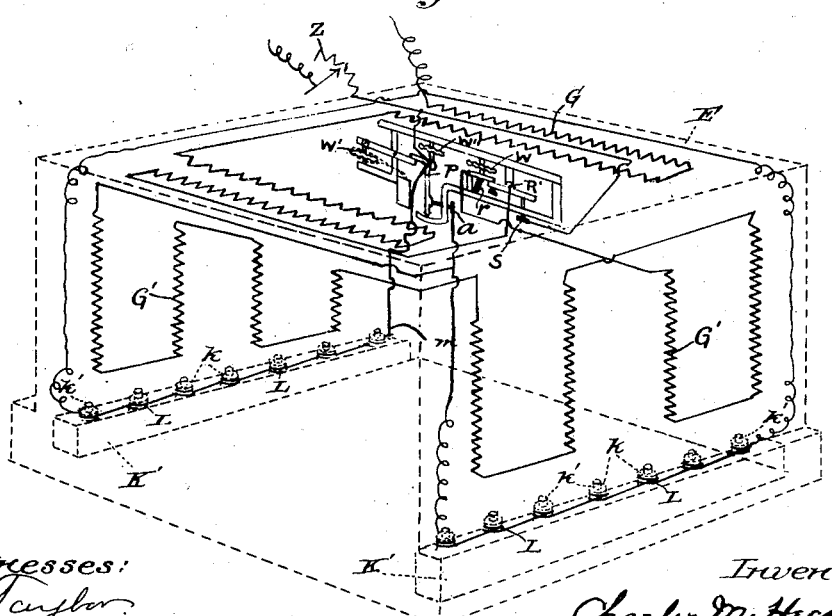

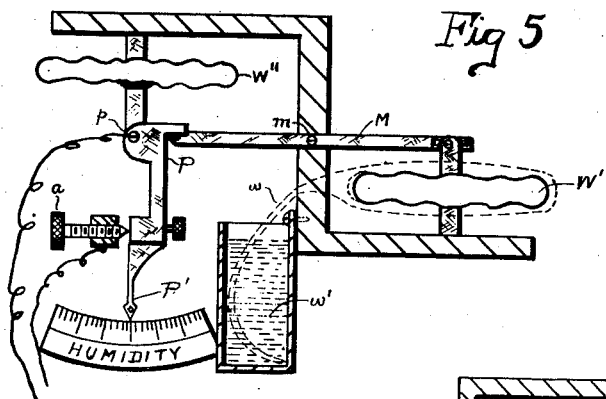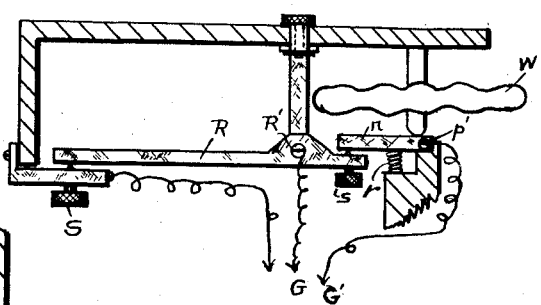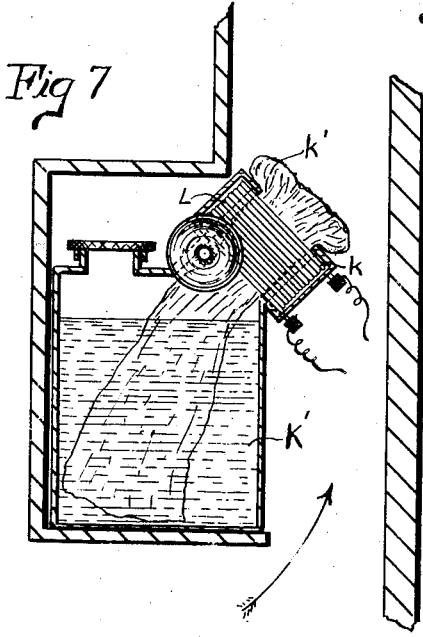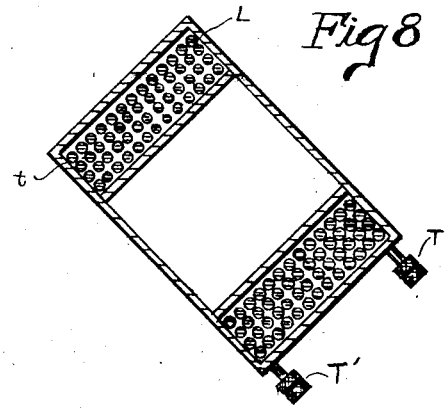

UNITED STATES PATENT OFFICE.

CHARLES M. HECK, OF RALEIGH, NORTH CAROLINA.

APPARATUS FOR INCUBATING.

1,424,821.  Specification of Letters Patent.  Patented Aug. 8, 1922.

Application filed November 19, 1914. Serial No. 873,031.

*To all whom it may concern:*

Be it known that I, CHARLES M. HECK, a citizen of the United States, residing at Raleigh, in the county of Wake and State of North Carolina, have invented certain new and useful Improvements in Apparatus for Incubating, of which the following is a specification, reference being had therein to the accompanying drawing.

This invention relates to an improved apparatus for incubating. It has been recognized in this art that proper regulation is an essential to successful incubation and many attempts have been made in the past to secure this regulation.

Regulation may be defined as the maintenance of a condition in an incubator that will meet the requirements of the developing chickens through the stage of hatching, both from a standpoint of heat required, ventilation demanded and moisture needed.

The present invention is designed to meet the conditions above outlined automatically and at the proper time during the period of incubation and comprises generally speaking, a method of operation whereby as animal heat is generated the supplied heat is diminished, and a regulated quantity of ventilated air introduced at the proper time, the variable action being controlled largely through the increment of the animal heat generated by the hatching chickens.

The invention also comprehends the supplying to the interior of the incubator of moisture proportionate to the demand required during the various stages of incubation The apparatus illustrated and presently to be described represents somewhat diagrammatically, a form and construction for carrying out the invention, and it is to be understood that wide variations and changes can be made without departing from the general principle and nature of the invention.

For convenience of illustration I shall refer to electricity as the heating medium, utilizing in that particular suitable resistance coils, but manifestly other controllable heating mediums may be employed in lieu thereof.

The apparatus shown is designed to supply a sufficient amount of heat to an incubator chamber in the initial stages of incubation to create proper temperature for the eggs therein contained and in connection therewith thermostatic means are employed for reducing the primary heat supply and simultaneously and conveniently causing ventilation, preferably by interposing into the ventilating ducts or flues, suitable heating means, thereby creating an updraft and a forced circulation of air, preferably heated air, into the incubator.

As the animal life develops in the eggs, a large amount of animal heat is given off and if the initial heat supply is maintained the temperature in the incubator would be too great. Illustrating, a temperature starting at 102 degrees with a given amount of heat supplied, would after the initial stages of incubation soon build up through the addition of the animal heat in the eggs, a temperature of one and one-half or two degrees higher. The maintenance of such temperature for any considerable length of time would result in destructive consequences. I therefore provide an automatic means of cutting down the initial supply of heat and introducing fresh ventilating air forcibly into the incubator at that period through the instrumentality of energized heating coils within the ventilators, automatically thrown into operation and very conveniently, by causing the current passing through the main coils to pass also through the ventilating coils, thus simultaneously cutting down the total heat supplied and also redistributing it. As the chickens develop in the incubator, a greater amount of animal heat is, as stated, thrown off and therefore a greater amount of ventilation is required, and by so arranging the heating coils, both in the incubator and in the ventilating flues, a very rapid change of conditions, fluctuating momentarily is produced and maintained, so that as the heat increases through the addition of animal heat, the primary source of heat is modified and heated ventilating air is forced into the presence of the eggs. It is necessary, under such conditions also to have a proper amount of moisture, proportionate to the condition of the requirements of the chickens, and this is acquired by the employment of suitable means for supplying automatically variable amounts of moisture, all as to be presently described.

The invention may be briefly characterized as one wherein the eggs are subjected primarily, to a given temperature, are then supplied with heated fresh air, which supply of fresh air is increased proportionate to the increment of animal heat generated by the hatching chickens during incubation, and supplying moisture in the proper proportion during said incubating period.

In the accompanying drawings I have shown an apparatus for carrying out the invention wherein, Figure 1 is a side elevation of an incubator of what may be termed the domestic type;

Fig. 2 is a longitudinal section;

Fig. 3 is a cross section;

Fig. 4 is an outline perspective of the top showing diagrammatically the arrangement of heaters.

Fig. 5 is a sectional view of the hygrostat;

Fig. 6 is a similar view of the thermostat; and Figs. 7 and 8 are similar views of the wick-holder and heater therefor, respectively.

In constructing the body part of the incubator in its simplest form, and in which particular it is to be understood that the general principle can be applied in forms widely different in proportions, arrangement and size, suitable uprights A are employed constituting the supports. These uprights are united by suitable side bars A' and by cross facing boards B', B². These facing boards are extended upward to a point some distance below the top of the uprights and terminate likewise a distance short of the lower end of the uprights, as clearly shown in Figure 2. A bottom member B is attached permanently to the sides and has formed therein ventilating doorways B⁴, which may be provided with regulating slides b⁴, and conveniently similar slides may be placed in the bottom part at other points. The general arrangement of the bottom part is on the arc of a circle, as shown and for the purpose presently to be described.

Directly above the bottom is the brooder tray member C, having its end portions slidably supported between suitable cleats c. This tray member is, by preference, an open frame having stretched thereon suitable porous material. Immediately above the brooder tray is the egg tray D, slidably mounted in suitable cleats on the facing boards. These various trays may be of any convenient or known form, as they specifically do not constitute a part of the present invention. The egg tray is located some considerable distance below the top presently to be described, leaving thereabove a relatively large space for heating and ventilating purposes.

As thus described, the construction represents substantially an open frame with three cross partitions, represented by the bottom, brooder and egg trays, and with the uprights projecting above and below the structure proper. In this condition, the entire body member is of somewhat skeleton formation, and easily accessible for cleaning purposes or for placement of the eggs and the removal of the brood.

The top unit or section E is in the form of an inverted box having four side walls and a top. This top is made preferably of such material as will conserve the heat therein contained, and is fashioned to fit over the body part. With this in view, the ends e of the top fit closely the outer faces of the uprights, and thereby form between the said ends and the sheathing board of the body part, ventilating flues E' opening at their bottoms well below the bottom part of the body and at their tops below the top of the uprights, closely adjacent the egg tray, as clearly shown in Figure 2. The top is formed on its forward side conveniently with a glazed window designed to be located directly in front of the two trays, as is customary in incubators. The material used in the construction of the top can be composite lumber or cellular composition to render the top as light as possible for the purpose of easy removal and replacement on the body. In this connection, any suitable attachment, as for instance a handle E' can be attached to the top, which in turn may be attached to a suitable rope designed to pass over a pulley, not shown. Blocks F² are employed to limit the downward movement of the top.

For supplying heat to the incubator chamber conveniently a series of resistance coils G are secured in the upper portion of the top, which coils are preferably arranged in series (ordinary light bulbs can be used if desired, as usual).

Located within the ventilating flues E' are a series of heating coils G'. These coils are preferably arranged in series with the main heating coil G, and a thermostat comprising member W, R and S supported on bracket Q is arranged to short circuit the flue coils G' as soon as the temperature within the incubator reaches a point below the temperature required for the proper incubating stage. A detail of one suitable form of this thermostat is shown in Fig. 6, in which an expanding member W presses against a lever n, pivoted at p' and pressed upward by spring r. The end of the lever n rests against an adjusting screw s in one end of a lever R, pivoted at R', the other end of the lever R making contact with an adjusting screw S, which is electrically connected to one of the terminals of the source of current. The other source terminal is connected to one end of the coil G, and the other end of the coil G is connected to the lever R through the pivot R' and to this end of the coil G is also connected one end of the flue heating coils G'.

The current will be switched automatically through the flue heaters which as stated, are in a series with the primary heater G, the thermostat operating the switch s". This will materially lessen the heat in the top of the incubator and by heating the air in the ventilating flues a rapid movement of air is caused or created, and owing to the fact that the ventilating flues terminate well below the bottom of the incubator a rapid updraft of fresh air enters through the flues into the top of the incubator, just above the eggs, where it is most needed, tending to cool the eggs to the degree required, the draft passing through the trays and out through the bottom of the incubator chamber which is located, as stated, above the intake end of the ventilating flues. Thus a natural draft is created and permitted and is accelerated considerably by the heating of the air in the ventilating flues. It may be noted in this particular that the air in the ventilating flues being heated, prevents the chilling of the eggs and at the same time renders a condition in the incubator substantially normal and so with relation to the requirements of the growing chickens at all stages of the process. It may be here noted that during the latter stages of incubation less heat is required than in the preliminary stages and this diminution is secured by ventilation rather than by the cutting off of all the heat. If the ventilating flues are heated at all times, rapid ventilation or passage of air takes place and by this means the proper condition is maintained.

Located at the lower edge of the end walls of the top part of the incubator are shelves K. These shelves are arranged between the adjacent uprights and are designed to receive and support water receptacles K'. The water receptacles, shown in detail in Figs. 7 and 8, are provided with wick tubes k having wicks k' therein, the major portion of which are placed within the water within the receptacle and may be raised or lowered, much as lamp wicks are raised or lowered. The wick tubes with their protruding wicks are projected obliquely outward into the ventilating flues so that the air passing up through the flues will come in contact with the saturated wicks and absorb the moisture therein contained. These wick holders k are conveniently fashioned to receive large wicks and two or more may be applied to the reservoir. Surrounding the wick holders are heating coils L as shown in Fig. 8, with the wire t and terminals T and T', which are put either in parallel or in series with the flue coils G'. When the current is passed through the flue heaters to create a draft therein, as above explained, the wick tubes will be heated simultaneously and thereby cause a rapid evaporation of the water contained in the wicks, which water or vapor will be taken up promptly by the uprising air and projected into the incubator chamber. For convenience I shall term these moisture supplying devices as "water lamps", meaning thereby receptacles having wicks and wick tubes. It should be understood that it is necessary in incubation to have considerable moisture added where rapid air circulation exists and the provision of the heating means for amplifying the moisture as the air passes into the incubator is an important feature of the invention. It is however, to be observed that under certain conditions this moisture should be regulated in a manner to prevent overdampening or underdampening and to accomplish this result I place in the shunt circuit within which the water lamp coils are arranged a hygrostat W' W".

An enlarged detail view of the hygrostat is shown in Fig. 5, wherein W" and W' are two expanding elements, the latter being kept moistened by a wick w fed from a reservoir w'. W" supports a hanging lever P which being pivotally mounted at p can be rocked by a lever M pivoted at m and connected to the expanding element W' at the end furtherest from the lever P. If the two arms of the lever M are made of equal length, or the adjustment is made so that the end of the lever pressing against the lever P to rock it moves down with a rise in temperature due to the expansion of the member W' is equal to the downward motion of the lever P due to the expansion of the member W", the lever P will rock only when the members W' and W" have a difference in temperature, made by the evaporation of the water in the wick w. This being a direct measure of the rate of evaporation of the eggs gives the desired control through electric contact between the screw a and the lever P. I have placed the hygrostat in series with the flue coils G', so that a slight decrease of the flow of the air is produced as well as increase in moisture whenever the humidity falls too low. The hygrostat is designed to operate for closing the circuit when the moisture becomes below the normal and the reverse when there is too much moisture. Upon the closing of the circuit the current is passed through the heaters for the purposes specified.

By causing the ventilating air to enter immediately above the eggs, as distinguished from the top of an incubator I believe that a more accurate regulation is obtained with better results, but to insure a proper distribution of the air I curve the bottom as above stated so that the air naturally flows through all parts of the tray containing the eggs. The curvature at the bottom causes a reflection of the air out of the open back Y (Fig. 2) and prevents it from descending vertically through one part or only through the outer layers of the eggs and thence directly out through the bottom. With the curved bottom the air is forced to pass generally throughout the entire layer of eggs. I do not wish it understood, however, that the invention is limited in any particular to the use of this curved bottom, as I believe the general principles can be applied without that feature and so with success, and in some cases it may be desirable to change the position of the outlet of the ventilating flues.

The operation of the apparatus will be substantially as follows: When the eggs are first placed in the incubator the heat from the primary coil will be sufficient to maintain a proper temperature, in which particular any approved regulator may be employed such as the rheostat Z, the coils of which may be placed inside the cover as part of the heating coil G or on the outside as shown. Upon the incubator becoming overheated the thermostat is operated and thereupon heated air is circulated rapidly through the incubator and the normal condition reestablished. By the use of the hygrostat proper humidity of the air is maintained.

Having thus described the invention, what I claim as new and desire to secure by Letters Patent is:

1. In an incubator the combination with an incubator chamber and ventilating flues, means for heating the chamber, means adapted to be operated for heating the ventilating flues, and means acting automatically to throw into operation the ventilating flue heaters upon the building up of a temperature in the incubator above a given point.

2. In an incubator, the combination with an incubating chamber containing eggs and having its air exit below the level of the eggs, means above the level of the eggs adapted to be supplied with energy to heat the chamber, a ventilating flue leading into said chamber above said eggs, a separate means adapted to be supplied with energy to cause a draft through said flue, a supply of energy, and means acting automatically when the temperature in said chamber is above a certain point to cause energy from said supply to flow into said separate means.

3. In an incubator, the combination with an incubating chamber and means adapted to be supplied with energy to heat said chamber, a ventilating flue leading into said chamber, means adapted to be supplied with energy to cause a draft through said flue, an energy supply, and means operating automatically when the temperature in said chamber rises above a given point to cause energy to flow from said supply into the second said means and decrease the amount of energy flowing from said supply into the first said means.

4. In an incubator, the combination with an incubating chamber and heating means therefor, of a ventilating flue for said chamber, a separate heating means acting on said flue to cause a draft therethrough, and means acting automatically when the temperature in said chamber has risen above a desired point to cause the second said means to become operative.

5. In an incubator, the combination with an incubating chamber and heating means therefor, of a ventilating flue for said chamber, heating means acting on said flue to cause a draft therethrough, and means operating automatically when the temperature in said chamber has risen above a certain point to cause the second said means to become heated and to cause the first said means to have its temperature decreased.

6. In an incubator, the combination with a primary electrical heater, of a ventilating flue, an electrical heater for the ventilating flue, and means acting simultaneously to vary in such manner the heat in the primary heater and the heat supply to the ventilating flue heater, that a decrease in the heat in one of said heaters will be accompanied by an increase in the heat in the other of said heaters.

7. In an incubator, the combination with an incubator heating unit, of a ventilating flue having a heating unit therein, and a thermostat for causing a diminishing of heat in the one and increasing it in the other.

8. In an incubator, the combination with a chamber having heating coils in the top thereof, of ventilating flues, heating coils in the ventilating flues in series with said other coils, and thermostaticly operable means for decreasing the heat in the ventilating coils.

9. In combination with an incubating chamber having means for discharging air into it near its top, a bottom for said chamber inclined upward from the point vertically beneath the point of entrance of the air discharged into the chamber and air outlets in said bottom at different levels.

10. In combination with an incubating chamber and means for discharging air into it at two points near the top on opposite sides of the chamber, a bottom for said chamber inclined upward from beneath the said two air discharge points and toward the center of said bottom, and ventilating openings at different levels in said bottom.

11. In an incubator the combination with a chamber, means for heating the same, a ventilating flue, means for heating the flue, a water supply, located within the flue, and means operable only during the operation of the flue heating means to heat the water supply.

12. In an incubator, the combination with a chamber and means for heating the same, of a ventilating flue, a heater within the flue, a water supply comprising a wick projecting into the flue, means for heating the wick to a temperature above that of its surroundings to cause the water therein contained to evaporate, and controlling means for the wick heating means arranged to be influenced by the humidity in the chamber.

13. An incubator comprising a body part having upright members, sheathings connecting the upright members transversely at the ends and terminating below the top of the upright members and above the bottom thereof, and a top part slidably supported and extending over the body part, the ends of the top part engaging the outer faces of the uprights to form ventilating flues therebetween, substantially as described.

14. In an incubator, the combination with a body part having trays and ventilating openings, of a removable top part having sides extending below said trays to constitute with the adjacent structure a ventilating flue, and heating means positioned in the ventilating flue.

15. In an incubator, the combination with a body formed of a skeleton frame having trays thereacross of an inverted box forming a top part fashioned to embrace the body part and constituting the sides and ends thereof, the body part having an outlet in its lower portion and a depending portion of the top part extending below said outlet, a ventilating flue between the top and the body part, heating means in the top part, and means for heating the flue.

16. In an incubator, a heating coil, a ventilating flue, a heating coil for the ventilating flue, and automatic means for cutting in the ventilating coil subsequent to the heating of the heating coil.

17. In an incubator having ventilating flues extending from below the bottom thereof to a point below the top, heating coils in the top and heating coils in the flues, and means for automatically establishing electrical connection between the top heating coils and the flue heating coils.

18. In an incubator, an incubating chamber, a ventilating flue, a moisture supplying device, instrumentalities for heating said device, and means for preventing said last mentioned instrumentalities from operating when said air flow is stopped and for controlling the flow of air in said flue.

19. In an incubator, the combination with a body and cover member, a ventilating flue terminating below the bottom of the incubator formed in part by said cover member, a shelf on said cover member located at the bottom of the flue, and a removable vapor supplying device on the shelf.

20. In an incubator, a heating coil, a ventilating means including a coil in series with said heating coil, and thermostatically controlled means for short circuiting the ventilating coil.

21. An incubator comprising an inverted box supported by a plurality of uprights spaced apart and extending from below up into the box, the outer faces of said uprights being in contact with the inner surface of the box, sheathing between a pair of said uprights parallel to and spaced apart from a wall of said box and extending to a point below the top of the box, a tray supported by said uprights, and a perforated bottom for said box above the bottom of said sheathing and extending from the sheathing to contact with the other sides of the box.

22. An incubator comprising an inverted box having a partition wall dividing said box into a large and small vertical flue connected at their upper ends, an egg tray and a perforated bottom for the large flue, said bottom extending completely across the large flue and being higher at all points than the bottom of said smaller flue, and means for heating the incubator and causing air to move up the small flue and down the large flue.

23. In an incubator, a ventilating device having a coil therein and a humidifier, a heating coil for said humidifier, in series with said ventilating coil, and hygrostatically controlled means for short-circuiting the humidifier heating coil.

24. In an incubator, an interior supporting framework, a tray mounted thereon for the eggs, and a removal cover part thereon, said cover part having a portion depending alongside an adjacent portion of the framework to provide a ventilating passage therebetween having an inlet below the level of said trays, said trays having air outlets beneath them but above the inlets of said ventilating passages.

25. In an incubator, an interior supporting framework adapted to accommodate the eggs, and a removable cover part thereon, said cover part having a portion depending alongside an adjacent portion of the framework to provide a ventilating passage therebetween, in combination with a heater in and adapted to be carried by said cover part, the body of the incubator being provided with an outlet opening in its lower portion arranged above the inlet to said ventilating passage.

26. In an incubator, an interior supporting framework adapted to accommodate the eggs, and a removable cover part thereon, said cover part having a portion depending alongside an adjacent portion of the framework to provide a ventilating passage therebetween, in combination with an outlet from said framework at the lower portion thereof, but arranged at a point above the inlet end of the ventilating passage and means for creating a downward circulation through the eggs to said outlet.

27. In an incubator, an interior supporting framework adapted to accommodate the eggs, and a removable cover part thereon, said cover part having a portion depending alongside an adjacent portion of the framework to provide a ventilating passage therebetween, in combination with heaters in the cover part, one located in the upper portion thereof, and the other in the ventilating passage, and automatic means for relatively controlling said heaters, all adapted to be carried by the removable cover part.

28. In an incubator, an interior supporting framework adapted to accommodate the eggs, and a removable cover part thereon, said cover part having a portion depending alongside an adjacent portion of the framework to provide a ventilating passage therebetween, in combination with heaters in the cover part, one located in the upper portion thereof and the other in the ventilating passage, an air moistener, and automatic means for relatively controlling said heaters and air moistener, all adapted to be carried by the removable cover part.

29. In an incubator, means for supporting the eggs, a container for said means having a ventilating passage, a heater in the container adjacent to the egg supporting means, a heater in the ventilating passage, and an air moistener, said heaters and moistener being operatively related to be automatically and relatively regulated by the increasing heat generated by the eggs.

30. In an incubator, two chambers, one of less depth than the other, the former being adapted to contain the eggs to be treated and having suitable heating means, and the latter constituting a ventilating flue and also having suitable heating means distributed down its depth, and means regulating the relative distribution of heat in the two chambers by varying the heat in the ventilating flue.

31. In an incubator, a heating circuit, a ventilating device including an electrical circuit in series with said heating circuit, and thermostatic controlling means for short circuiting the circuit of the ventilating device.

32. In an incubator, the combination with a body part having an egg supporting tray and ventilating openings, of a top part removable therefrom and having a side portion extending below said tray, and heating means including a moisture producing device mounted on said depending portion of the top part to be carried by and removable therewith.

In testimony whereof I hereunto affix my signature in the presence of two witnesses.

CHARLES M. HECK.

Witnesses:
A. T. SHAW,
JOHN H. BOUSHALL.